US006928800B2

(12) United States Patent
Huff, Jr.

(10) Patent No.: US 6,928,800 B2
(45) Date of Patent: Aug. 16, 2005

(54) BIOCIDE APPLICATOR FOR SUGAR CANE

(76) Inventor: Jim T. Huff, Jr., Texas Rd., Hwy. 3044, Waterproof, LA (US) 71375

( * ) Notice: Subject to any disclaimer, the term of this patent is extended or adjusted under 35 U.S.C. 154(b) by 0 days.

(21) Appl. No.: 10/619,059

(22) Filed: Jul. 14, 2003

(65) Prior Publication Data

US 2005/0016145 A1 Jan. 27, 2005

(51) Int. Cl.[7] ............................ A01D 19/00; C13D 1/00
(52) U.S. Cl. ............................................ 56/16.8; 127/2
(58) Field of Search ................... 56/1, 16.4 R, 16.4 A, 56/327.1, 328.1, 500, 16.6, 16.8, 194; 99/487, 99/516, 534, 623; 15/3.12–3.14, 3.2, 3.4; 127/2, 6, 42, 43, 53–56

(56) References Cited

U.S. PATENT DOCUMENTS

| | | | |
|---|---|---|---|
| 3,430,583 A | 3/1969 | Pool et al. | |
| 3,734,777 A | 5/1973 | Bratschitsch | |
| 3,834,141 A | 9/1974 | Bracht et al. | |
| 4,204,491 A | 5/1980 | Quick | |
| 4,266,490 A | 5/1981 | Haines et al. | |
| 4,572,741 A * | 2/1986 | Mason | 127/2 |
| 4,662,163 A | 5/1987 | Adams | |
| 4,743,307 A * | 5/1988 | Mason | 127/2 |
| 5,148,738 A * | 9/1992 | Orman et al. | 99/487 |
| 5,981,554 A | 11/1999 | Bull et al. | |
| 6,125,621 A | 10/2000 | Burch | |
| 6,165,529 A | 12/2000 | Yang et al. | |
| 6,286,250 B1 | 9/2001 | Johnson | |

OTHER PUBLICATIONS

Kulkarni, VM; "Reducing Sugar Losses Due to Cut-to-Mill Delays Using The Novel Substance Sucroguard", Mar. 2, 2001(visited Mar. 22, 2002) 7 pages <http://www.sugaronline.com/journal/Articles/sucroguard.htm>.

* cited by examiner

Primary Examiner—Robert E. Pezzuto
(74) Attorney, Agent, or Firm—Sieberth & Patty, L.L.C.

(57) ABSTRACT

Apparatus for applying a biocide liquid composition to billets formed from sugar cane stalks. In one embodiment of the invention, the apparatus is comprised of a container for containing the liquid composition, a conduit in fluid communication with the container, and one or more nozzles in fluid communication with the conduit, the apparatus being sized and configured for connection to a billet-type sugar cane harvester so that the nozzles are disposed to direct the liquid composition onto the billets either before or as they are received by a hopper configured to receive the billets dispensed from the harvester during operation of the harvester. Related improvements to harvesters and methods of inhibiting microbial degradation of sugar cane.

20 Claims, 4 Drawing Sheets

BIOCIDE APPLICATOR FOR SUGAR CANE

BACKGROUND

Conventional harvesters for sugar cane employ a sugar cane stalk cutting mechanism to form billets which are conveyed through the harvester and into a hopper connected to the harvester. The freshly cut billets so formed are typically 9 to 12 inches in length, have exposed plant tissue at their ends and can be split or mutilated by the harvesting process. As such, the billets can serve as ideal hosts for microbes seeking a source of nutrients. Microbes which find a home in or on these billets can begin to break down sugar components in the billets, thereby decreasing the ultimate sugar yield realized from the harvested billets. The longer the billets are stored prior to processing, the more likely it is that microbial degradation of the sugar components in the billets will take place. Moreover, billet-type sugar cane harvesters are capable of harvesting sugar cane which has fallen down or which has become twisted through exposure to weather elements. Such cane often has exposed plant tissue even before the billet harvester cuts the stalks, increasing the likelihood of microbial activity in the sugar cane which is detrimental to sugar yield and overall crop quality.

In the past, microbiocide (also referred to herein as "biocide") has been applied in the sugar mill process, with the quantity of microbiocide applied typically being divided between the tandems mills and the first cutting knives of the mill for bacteria control. In regions of the world where transportation of harvested product is difficult and time-consuming, anti-bacterial agents have been applied by a hand sprayer onto hand-cut sugarcane, or by hand-dipping the ends of the sugarcane stalks in microbiocide solution. Others have applied anti-bacterial agents after the cut sugar cane has been cleansed at an off-field cleansing station prior to product transport by rail or truck. All such methods, however, permit the passage of time between the time the cane stalks are cut and the time the microbiocide is actually applied.

A need therefore continues to exist for a system or method which efficiently inhibits microbial degradation of harvested sugar cane to thereby maximize the sugar yield realized from sugar cane harvesting.

SUMMARY OF THE INVENTION

The present invention satisfies this and other needs in a unique and economically feasible way, by providing, among other things, apparatus for applying a biocide liquid composition to billets formed from sugar cane stalks. In one embodiment of the present invention, the apparatus is comprised of a container for containing the liquid composition, a conduit in fluid communication with the container, and one or more nozzles in fluid communication with the conduit. In this embodiment of the invention, the apparatus is sized and configured for connection to a billet-type sugar cane harvester so that the nozzles are disposed to direct the liquid composition onto the billets either before or as they are received by a hopper configured to receive the billets dispensed from the harvester during operation of the harvester.

Another embodiment of the present invention provides an improvement to a billet-type sugar cane harvester. The improvement comprises one or more nozzles disposed at the periphery of the down-spout of a billet conveyor portion of the harvester, a conduit in fluid communication with the one or more nozzles for supplying a flow of a liquid biocide composition to the one or more nozzles, and a container for storing the liquid biocide composition and dispensing the same into the conduit.

Yet another embodiment of this invention is a method of inhibiting microbial degradation of one or more components of sugar cane billets formed from sugar cane stalks. This method comprises the step of applying a biocidal liquid composition to the billets while the billets are either conveyed through or dispensed from a billet-type sugar cane harvester.

These and other embodiments, objects, advantages, and features of this invention will now become apparent from the following description, accompanying drawings and appended claims.

BRIEF DESCRIPTION OF THE DRAWINGS

In each of the above figures, like numerals or letters are used to refer to like or functionally like parts among the several figures.

DETAILED DESCRIPTION OF THE INVENTION

As will now be appreciated, the present invention facilitates the application of microbiocide directly to chopped sugarcane only seconds after it is cut. One of the several advantages provided by this aspect of the present invention is the fact that cane mills and cane growers will immediately benefit from deterrence of inversion of sugarcane juice and dextran formation, which reduces sugar yield in a very direct way. Another advantage is increased sugar mill efficiency through reduction in the presence of polysaccharides (produced during microbial activity upon the cane), which are believed to be detrimental to the processing of sugar throughout the mill. In the practice of this invention, the sugar cane billets pull the microbiocide into the tissue of the cane, along with the infectious bacteria. In this way, the microbiocide fights the infection at the point of infection.

Still another advantage offered by the present invention arises from the fact that billet cane harvesters can also harvest down and lodged cane. Yields continue to rise now that down and severely lodged cane is not as difficult to harvest as with the previous harvesters, e.g., the soldier harvester. More cane will continue to fall down with ever increasing higher-yielding varieties. During this falling and twisting, growth cracks become more prevalent, which allows large colonies of bacteria to enter into these cracks. These down sugarcane areas are harvested along with the standing sugarcane and increase the infection of the entire sugarcane field even when the milling time from cut to grind is short. The application of microbiocide from the billet harvester will also help with the basic problem of purchasing cane by tonnage. This application will raise the overall quality of field sugarcane delivered to the mill.

Figure 1:
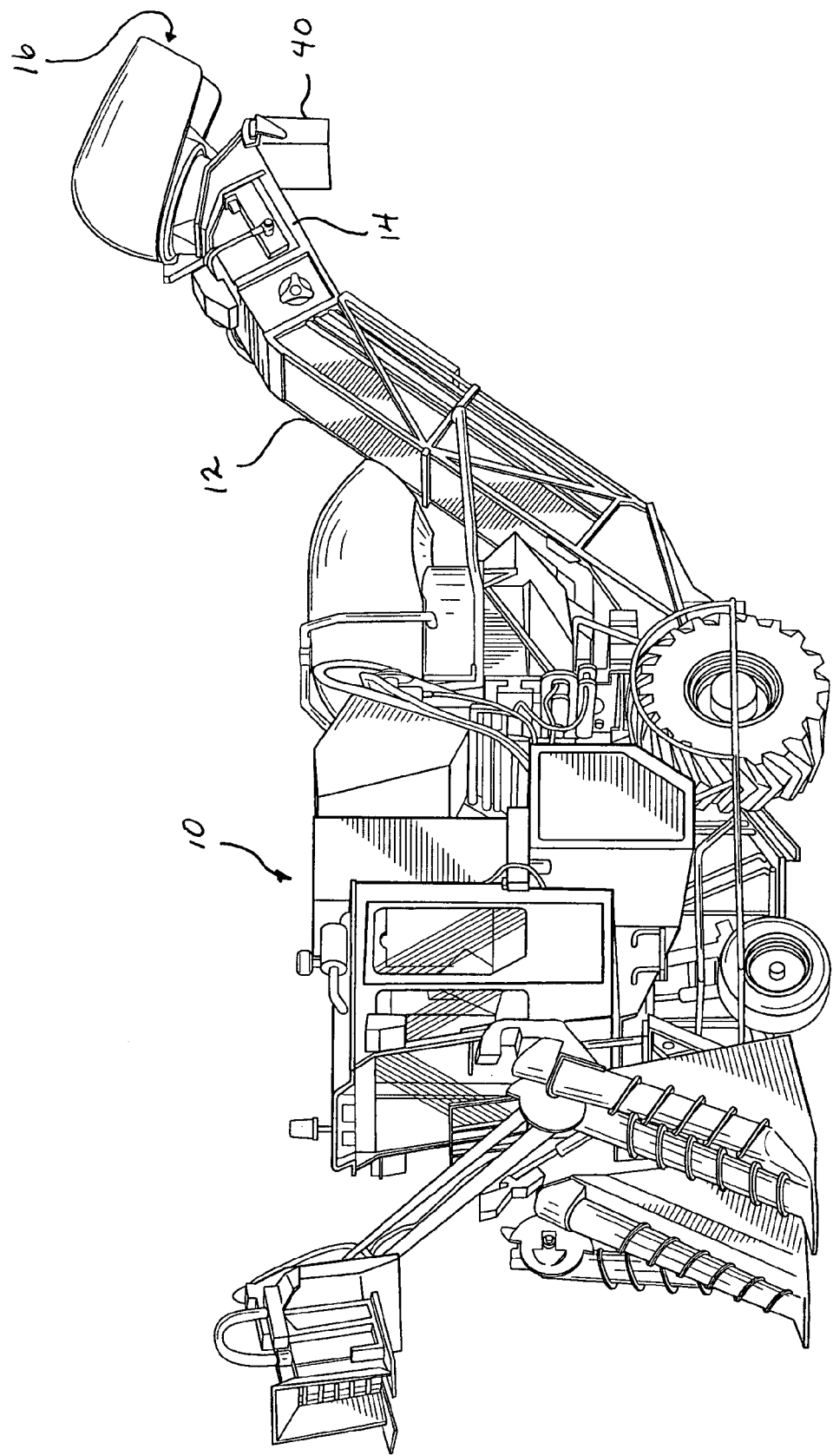
FIG. 1 is a side angled view in perspective of an exemplary billet-type sugar cane harvester from the prior art.
Figure 2:
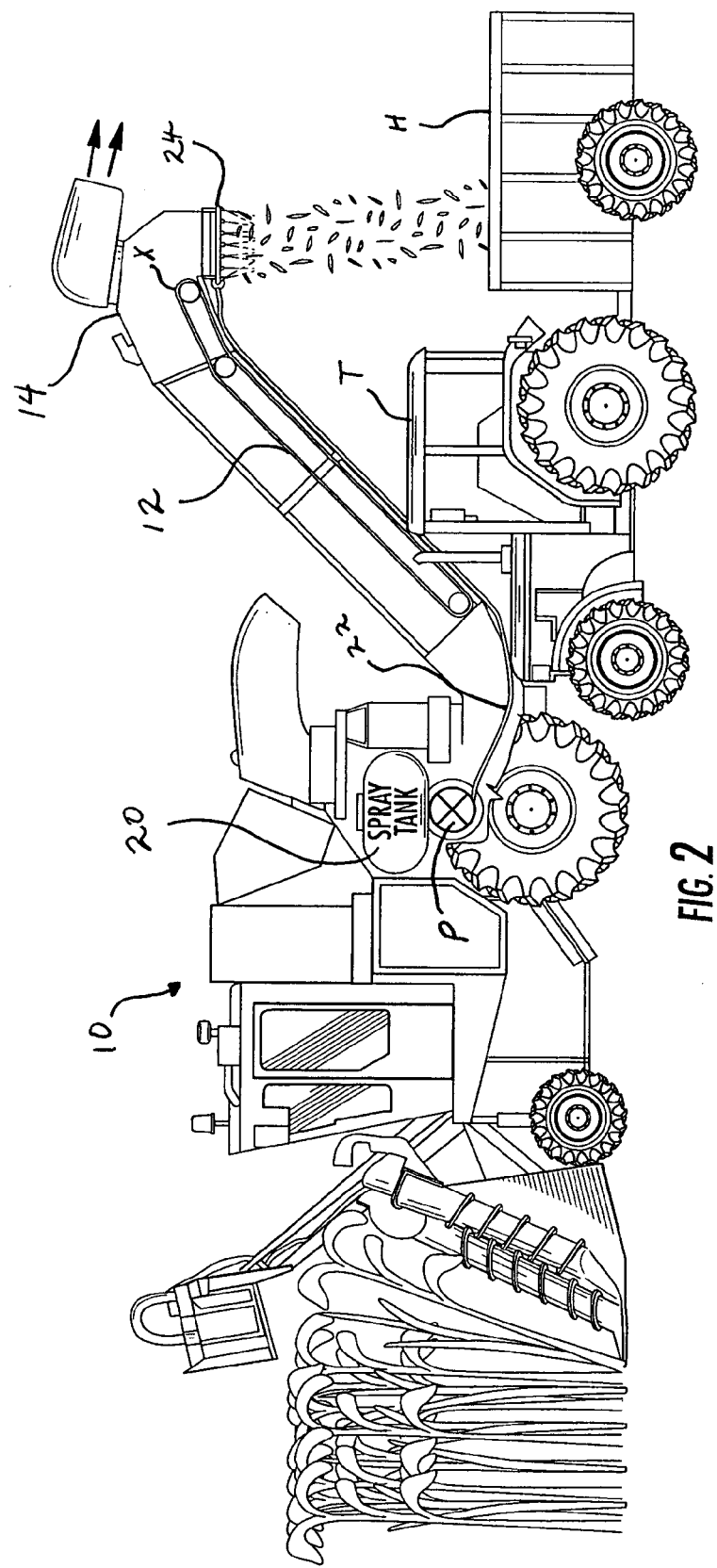
FIG. 2 is a side view in persective of the harvester of FIG. 1 modified in accordance with one preferred embodiment of this invention, showing the harvester so modified during use in cooperation with a tractor pulling a hopper next to the harvester.

Turning now to the drawings, FIG. 1 illustrates one preferred embodiment of this invention. This illustration shows a billet-type sugar cane harvester 10. Harvester 10 includes a billet conveyor 12 which conveys cut segments of sugar cane stalks, i.e., billets, along with other cut parts of the sugar cane vegetation, away from the cutting portion (not shown) of harvester 10 toward a conveyor chute 14. Chute 14 includes a fan (not shown) which pulls a sufficient vacuum to cause undesirable portions of the vegetation to be separated from the desired cane billets and to be ejected from the chute through a blower passage 16. The desired billets and any vegetation or dirt not removed and ejected through blower passage 16 then falls out of chute 14 into a container. Such a container is illustrated in FIG. 2 as a hopper H which is being towed along side harvester 10 by a tractor T. While these figures illustrate one typical billet-type sugar cane harvester, there are several other designs of billet-type sugar cane harvesters which exist, and persons of skill in the art will appreciate that all such harvesters are within the scope of the present invention as long as they harvest sugar cane so as to produce a volume of cut stalks of sugar cane to be used in subsequent milling to produce an end product.

In a preferred embodiment of this invention illustrated in FIG. 2, the harvester 10 of FIG. 1 has been adapted to apply a microbiocide solution to the harvested billets. Specifically, harvester 10 has been adapted to include a microbiocide container in the form of a tank 20 in fluid communication with a pump P which, in turn, is in fluid communication with a fluid conduit in the form of a tube 22 which conveys the pressurized solution toward chute 14. At chute 14, tube 22 is configured for attachment to and fluid communication with a series of spray nozzles 24 suspended near the normal flow path of billets coming off of conveyor 12. In this way, billets falling through chute 14 fall through a spray zone in which the microbiocide solution is applied to the billets before they fall into hopper H. Preferably, the spray nozzles 24 are disposed under the billet chute so as to form a spray zone below a horizontal plane occupied by a top portion X of the billet conveyor belt, in order to minimize the amount of microbiocide solution which might be pulled up and out of the chute by the vacuum created by the fan which typically resides near the top of the conveyor chute. The spray zone formed by the spray nozzles preferably is sufficient to provide a biocidally effective level of coating to the billets. Of course, the level of coating which is biocidally effective will depend upon other factors, including but not limited to the concentration of the microbiocidal solution, the level of infection within the billets, the type of microbe(s) involved, and the microbiocide employed. The level of coating provided is typically at least enough to result in a deposit of from about 5 to about 20 ppm by weight of biocide on the cane, with or without any surfactant washing aid or other additive.

Figure 3:
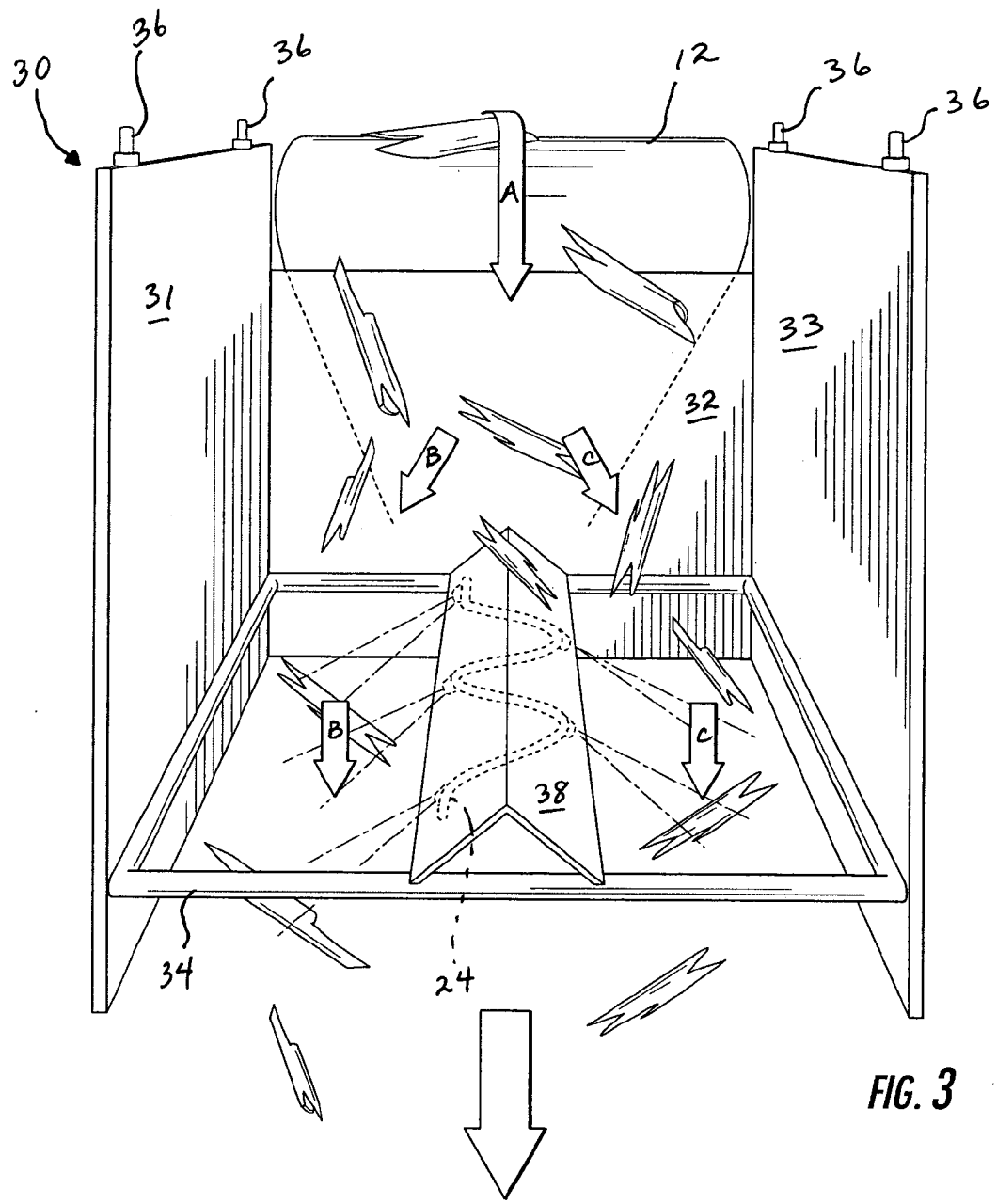
FIG. 3 is a rear side view in perspective of a harvester billet conveyor chute adapter according to a preferred embodiment of this invention.

Harvester 10 of FIG. 2 has been adapted to apply microbiocide to harvested billets using a preferred adapter illustrated in FIG. 3. There it will be seen that the adapter is comprised of a box frame 30 which is formed by three walls 31, 32 and 33 and a square support frame 34, which walls and frame are place together to form a box-like structure in frame 30. The structure is configured to be connected to chute 14 (see FIGS. 1 and 2) by being bolted thereto at four flanges 36. Box frame 30 is configured to permit conveyor 12 to convey billets into the space defined by frame 30. A divider baffle 38 extends across the lower portion of frame 30 and into a billet flow path illustrated with arrow A. Divider baffle 38 divides the billet flow path into two separate flow paths illustrated by arrows B and C. Billets following these separate flow paths enter respective spray zones into which microbiocide is sprayed via spray nozzles 24. Box frame 30 is sized to be deep enough so that the spray zone created by the spray from spray nozzles 24 remains effective notwithstanding any vacuum created by normal use of the conveyor 12 and and the fan (not shown) in the upper portion of chute 14. Box frame 30 has an open side opposite from conveyor 12 to accommodate a rubber flap 40 (FIG. 4 only) which, in some billet harvesters, extends downwardly from chute 14 and which may or may not be elevated using mechanical or hydraulic controls to adjust the position of the flap and to control the ejection of vegetation from the chute, if desired.

Figure 4:
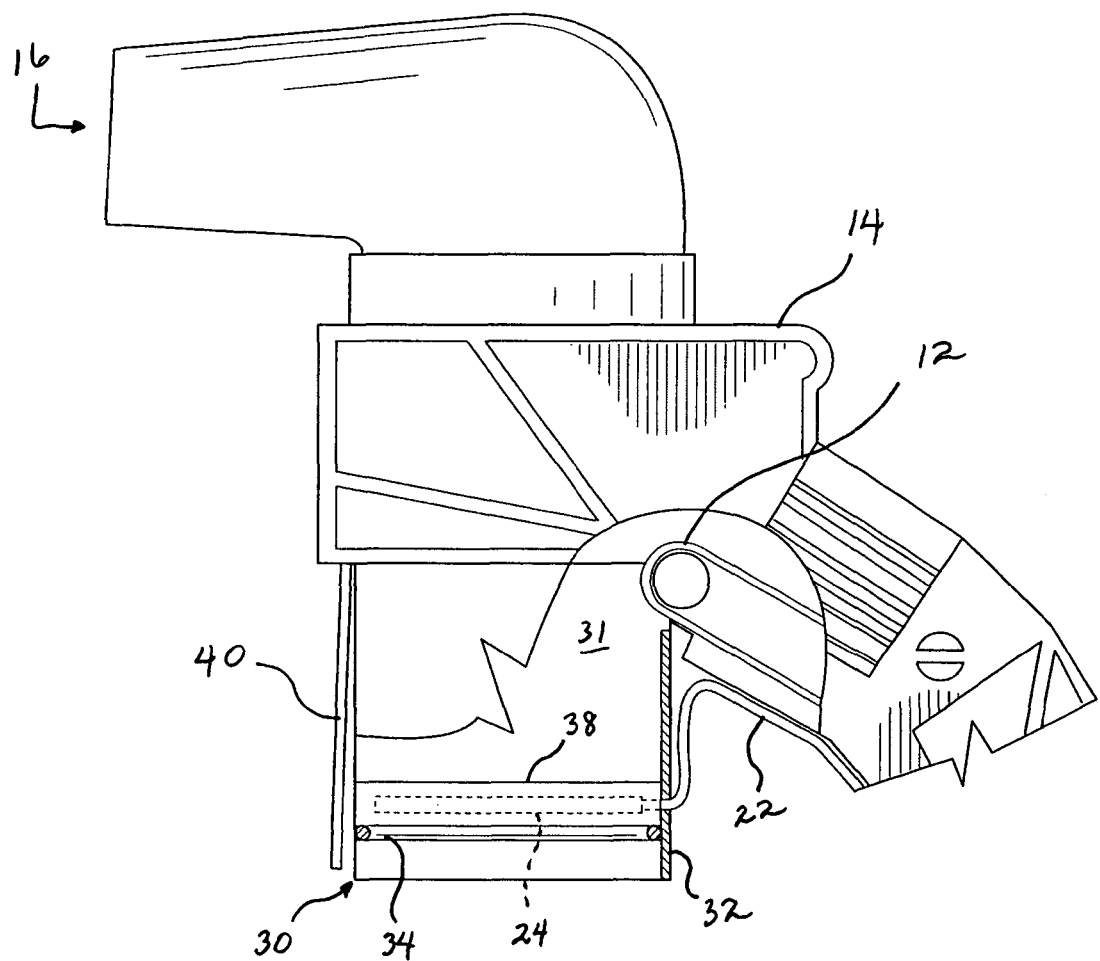
FIG. 4 is a side view in perspective of the harvester of FIG. 2, partially broken away, to illustrate how the chute adapter of FIG. 3 cooperates with the other components of the harvester.

FIG. 4 illustrates the adapter of FIG. 3 as installed on chute 14 of harvester 10. The view illustrated is from the side of chute 14 opposite of the side illustrated in FIG. 2. Rubber flap 40 extends down the rear end of chute 14 to cover the open side of box frame 30.

Of course, it will be appreciated that the particular shape of or material used to make, the adapter of this invention is not limited to the exemplary version illustrated in these figures. These aspects of the adapter of the invention will, to at least some extent, be determined by the configuration of the harvester to which the adapter is being attached, the type and/or height of the hopper into which the billets are placed, and the size and condition of the billets produced by the harvester.

Suitable biocide solutions for use in the present invention will comprise any biocide which is permitted for the intended use in the relevant legal jurisdiction, used at a aqueous concentration effective to achieve the desired level of microbiocidal activity in the vegetation to be harvested. Non-limiting examples of a suitable biocide solution components may comprise carbamates, carbonates, diamines, and quaternary ammonium compounds, as well as derivatives thereof or combinations of any two or more of the foregoing. The concentrations employed will vary with the particular biocide used in the liquid solution. As an example, a typical concentration for a carbamate microbiocide might be in the range of about 5 to about 20 ppm by weight. The microbiocide in aqueous solution may also be in the presence of other additives which might provide additional advantages in the use of the solution. For example, a surfactant may be added to the solution in order to assist in the subsequent cleansing of the billets during sugar mill processing. Non-limiting examples of suitable surfactants might include non-ionic surfactants, and the like. Other various additives, e.g., fragrance to eliminate biocide odor, might be considered suitable or desirable for inclusion in the microbiocide solution.

EXAMPLE

A 200-gallon solution tank, filled with a carbamate microbiocide solution, is mounted on a billet-type sugar cane harvester. A mechanical pump directs the solution from the tank into a set of spray tips that are directed downward from the harvester and sprays the cane as it falls from the billet conveyor of the harvester. An automatic electric shutoff valve only allows the microbiocide to be sprayed while the sugarcane is falling into the cart, preventing the microbiocide solution from being accidentally left on and spraying the end of the sugarcane row or in a ditch or body of water. This limits exposure to the environment and keeps the microbiocide on target. The automatic switch is wired to the loader control on the billet harvester. A red light in the operator's cab comes on when the pump is running and the flow of microbocide is supplied to the tips. A hooded shield is positioned around the spray tips to prevent wind drift of the microbiocide. The hooded shield has a cross bar divider to mix the microbiocide with the sugarcane as the cane falls into the pick up cart. Upon filling the cart, the cart is hauled out of the field and the billets are transported to storage or directly to a mill, and samples of the billets may be cultured to verify the efficacy of the biocide over time. By including surfactant in the solution applied to the billets so that wash water is not needed at the mill prior to milling, this application also reduces or totally eliminates the need for additional microbiocide application in the mill, resulting in additional savings.

It will also be appreciated that the biocide used in the present invention could be applied to the billets from different points along the harvesting process employed by the billet-type harvester, e.g., from one or more sprayers disposed at or near the harvester cane cutters, or disposed on or near the hopper into which the billets are conveyed, but the illustrated application configuration has advantages over these alternatives. For example, application in accordance with the preferred embodiment depicted in the drawings reduces biocide waste and increases coating coverage by applying biocide to the billets after at least some of the undesired vegetation has been removed from the product. In addition, application in the manner illustrated enables the use of a single biocide storage tank and adapter, while use of an applicator attached to the hopper would require more storage tanks and nozzle assemblies to be attached to each hopper employed, thereby increasing the overall cost of the system.

Each and every patent, patent application and printed publication referred to above is incorporated herein by reference in toto to the fullest extent permitted as a matter of law.

It should be appreciated that, while specific embodiments are described hereinafter, several other applications of the presently described invention may be contemplated by those of skill in the art in view of this disclosure. For example, while the accompanying drawings illustrate particular configurations for a biocide applicator, other configurations may be envisioned by those of ordinary skill in the art which still fall within the scope of this invention. Accordingly, the scope of this invention is not limited to the specific embodiments described in detail hereinafter. Rather, what is intended to be covered is as set forth in the ensuing claims and the equivalents thereof permitted as a matter of law. As used in this specification, means-plus-function clauses, if any, are intended to cover the structures described herein as performing the cited function and not only structural equivalents but also equivalent structures.

That which is claimed is:

1. Apparatus for applying a biocide liquid composition to billets formed from sugar cane stalks, the apparatus being comprised of a container for containing the liquid composition, a conduit in fluid communication with the container, and one or more nozzles in fluid communication with the conduit, the apparatus being sized and configured for connection to a billet-type sugar cane harvester so that the nozzles are disposed to direct the liquid composition onto the billets either before or as they are received by a hopper configured to receive the billets dispensed from the harvester during operation of the harvester.

2. Apparatus according to claim 1 further comprising pressurizing means for pressurizing the liquid composition fed into the conduit.

3. Apparatus according to claim 2 wherein the pressurizing means is a pump.

4. Apparatus according to claim 3 further comprising a controller for controlling the dispensing of liquid composition through the one or more nozzles.

5. Apparatus according to claim 1 further comprising a controller for controlling the dispensing of liquid composition through the one or more nozzles.

6. Apparatus according to claim 1 wherein the one or more nozzles are disposed around the periphery of a chute of a billet conveyor portion of the harvester so as to direct the liquid composition onto the billets while they pass through the chute during operation of the harvester.

7. Apparatus according to claim 6 further comprising pressurizing means for pressurizing the liquid composition fed into the conduit.

8. Apparatus according to claim 7 wherein the pressurizing means is a pump.

9. Apparatus according to claim 8 further comprising a controller for controlling the dispensing of liquid composition through the one or more nozzles.

10. Apparatus according to claim 1 wherein the one or more nozzles are disposed around the periphery of the hopper so as to direct the liquid composition onto the billets as they fall into the hopper during operation of the harvester.

11. Apparatus according to claim 10 further comprising pressurizing means for pressurizing the liquid composition fed into the conduit.

12. Apparatus according to claim 11 wherein the pressurizing means is a pump.

13. Apparatus according to claim 12 further comprising a controller for controlling the dispensing of the liquid composition through the one or more nozzles.

14. In a billet-type sugar cane harvester, the improvement which comprises one or more nozzles disposed at the periphery of the down-spout of a billet conveyor portion of the harvester, a conduit in fluid communication with the one or more nozzles for supplying a flow of a liquid biocide composition to the one or more nozzles, and a container for storing the liquid biocide composition and dispensing the same into the conduit.

15. The improvement according to claim 14, further comprising pressurizing means for pressurizing the liquid composition dispensed from the container and into the conduit.

16. The improvement according to claim 15 wherein the pressurizing means is a pump.

17. The improvement according to claim 16 further comprising a controller for controlling the dispensing of the liquid composition through the one or more nozzles.

18. The improvement according to claim 14 further comprising a controller for controlling the dispensing of the liquid composition through the one or more nozzles.

19. A method of inhibiting microbial degradation of one or more components of sugar cane billets formed from sugar cane stalks, the method comprising the step of applying a biocidal liquid composition to the billets while the billets are either conveyed through or dispensed from a billet-type sugar cane harvester.

20. A method according to claim 19, wherein the liquid composition is applied while the billets are falling through a chute of a conveyor of the harvester.

* * * * *